May 20, 1930. G. E. HOWARD Re. 17,669

APPARATUS FOR HANDLING GLASSWARE

Original Filed July 1, 1926 4 Sheets-Sheet 1

INVENTOR
GEORGE E. HOWARD
BY Robert W. Brown
Attorney

May 20, 1930. G. E. HOWARD

APPARATUS FOR HANDLING GLASSWARE

Re. 17,669

Original Filed July 1, 1926 4 Sheets-Sheet 2

INVENTOR

GEORGE E. HOWARD

BY Robson & Brown

Attorney

May 20, 1930. G. E. HOWARD

APPARATUS FOR HANDLING GLASSWARE

Re. 17,669

Original Filed July 1, 1926 4 Sheets-Sheet 3

INVENTOR
GEORGE E. HOWARD
By Robson A. Brown
Attorney

May 20, 1930.

G. E. HOWARD

APPARATUS FOR HANDLING GLASSWARE

Re. 17,669

Original Filed July 1, 1926

4 Sheets-Sheet 4

INVENTOR
GEORGE E. HOWARD
BY Robson & Brown
Attorney

Reissued May 20, 1930 Re. 17,669

UNITED STATES PATENT OFFICE

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE

APPARATUS FOR HANDLING GLASSWARE

Original No. 1,618,660, dated February 22, 1927, Serial No. 119,866, filed July 1, 1926. Application for reissue filed March 4, 1930. Serial No. 433,193.

My invention relates to the art of handling and heat-treating glassware.

It is customary, after glassware is formed and before it has become completely cooled, to transfer the ware from the molds to a lehr. A thin skin or chilled surface is formed on the ware by contact with the mold and with the atmosphere. The chilled skin should have sufficient strength to sustain the article against deformation through sagging of the inner semi-liquid portions of the glass body, and my invention has for one of its objects the provision of means for artificially cooling the ware, particularly heavy ware, so that transfer thereof to the lehr need not be delayed to permit the ware to cool through contact with the atmosphere.

In the case of lighter glassware, there may be too great cooling through contact with the atmosphere before the ware enters a lehr, and my invention includes means for either increasing the temperature of the ware or preventing it from cooling before it enters the annealing zone in the lehr tunnel.

Furthermore, in the case of heavy ware, the bottom of the ware may be so soft as to receive the impression of the lehr conveyor, particularly when a chain belt conveyor is employed, while the lighter ware may become cracked or checked through contact with the chain belt. I provide means for controlling the temperature of either light or heavy articles, so as to avoid these objections.

In some systems, the glassware is removed from the molds to a conveyor and is carried to a point in front of a lehr from whence it is transferred in groups to the lehr belt, each group constituting a row of ware that extends transversely of the lehr, so that the ware will be compactly placed upon the lehr belt and economy of space secured.

My invention has for an object the provision of means for compensating for differences in temperature as between the first article in such a row and the last article placed in said row so that all of such articles will be properly and uniformly annealed, and also means for maintaining the articles of a row at a predetermined temperature previous to their entry into the annealing zone of the lehr.

Some of the mechanisms by which my invention may be practiced are shown in the accompanying drawings, wherein Figure 1 is a longitudinal sectional view of a portion of a lehr, and means for bringing the glassware to the desired temperature previous to its entry into the annealing zone of the lehr, by heating or cooling, as conditions may require;

Figure 1:
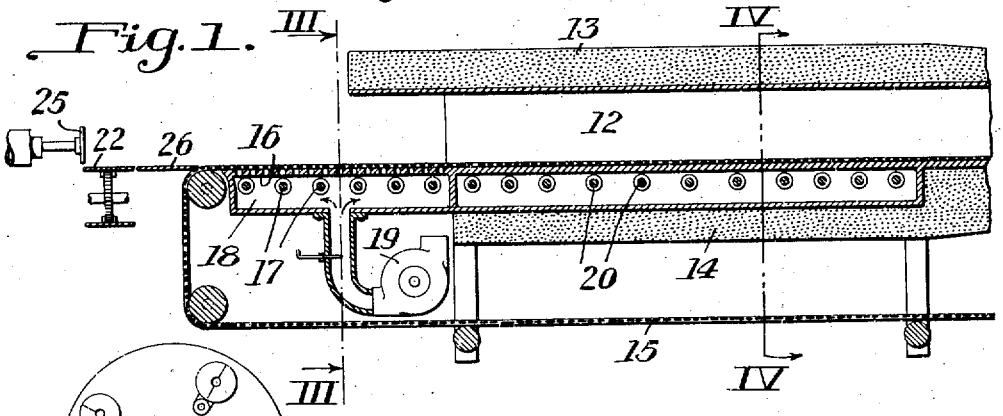
Figure 1:
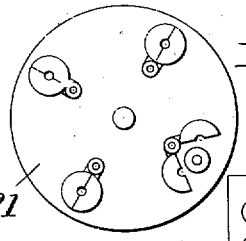

Referring to Figs. 1 to 4, I show a lehr tunnel 12 having heat-insulating top and bottom walls 13 and 14. A chain belt or other conveyor 15 is employed to carry the glassware through the lehr. The conveyor is preferably of open-work construction. In order to conduct air for heating or for cooling the glassware into contact with the bottoms and sides of the articles, the lehr is provided with a perforated apron portion 16 through which either hot or cold air may pass into contact with the glassware. The chamber beneath the apron 16 may be heated by electric resistors 17, electricity being preferably employed as the heating medium, as it permits of accurate controlling of temperature conditions. A blower 19 may be mounted beneath the chamber 18 and arranged to force either heated air or cold air through the perforations in the apron and in the conveyor. Electric resistors 20 may be provided for heating the lehr chamber.

The ware which is to be passed through the lehr may be removed from a mold table 21 to a conveyor 22 which carries the ware across the front end of the lehr. A stop 23 limits travelling movement of the ware and when the front article of a row of ware 24 reaches the position shown in Fig. 2, a fluid-operated pusher bar 25 is actuated to push a row of articles across a plate 26 to the lehr belt 15. The plate 26 may be inclined to a desired degree, so that its front and rear edges will be in proper alignment with the belt 16 and the conveyor 22.

Figure 2:
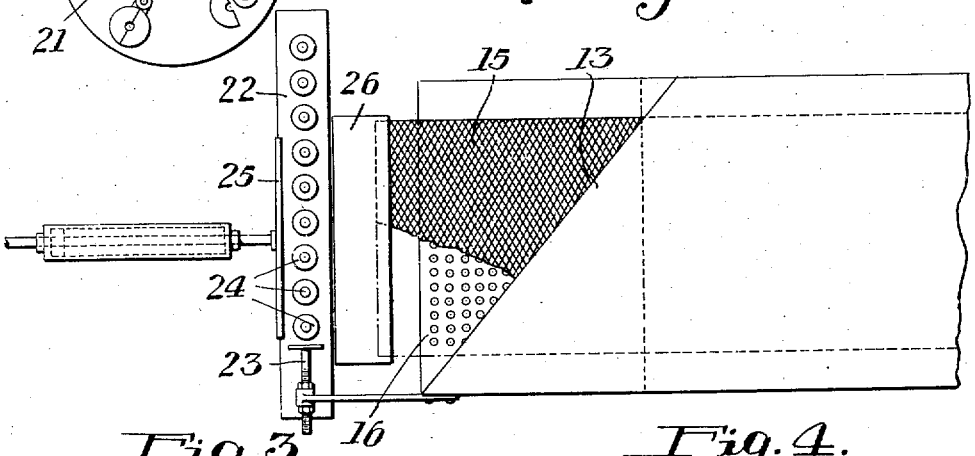
Fig. 2 is a plan view of the apparatus of Fig. 1, showing a lehr construction whereby each of a row of articles that are simultaneously placed upon a lehr belt will be subjected to varying temperature conditions within the lehr, to compensate for differences in temperature of the articles when placed upon the lehr conveyor.
Figure 3:
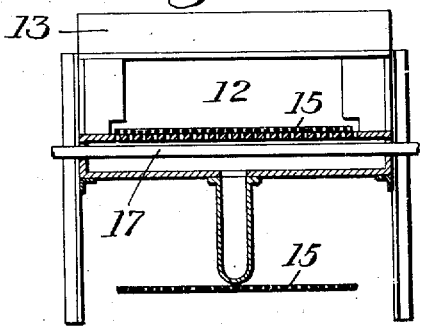
Fig. 3 is a vertical cross-sectional view taken on the line III—III of Fig. 1.
Figure 4:
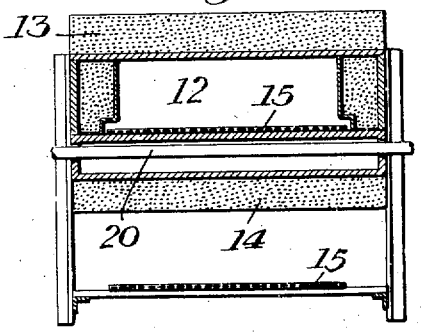
Fig. 4 is a vertical cross-sectional view taken on the line IV—IV of Fig. 1.

It will be seen that as the articles 24 are accumulated gradually on the conveyor and simultaneously transferred to the lehr belt, those articles to the front of the row will become cooler than the articles later assembled. In order to insure proper and uniform heat treatment of the various articles of each row, I cut away a portion of the cover 13, as indicated in Fig. 2, so that the cooler articles of glassware will be subjected to the heat within the lehr previous to the entry of the other articles. The lehr belt travels very slowly, and perhaps by stepped movements, so that by the time the rear article of a row has entered beneath the edge of the cover 13, the front articles will have been subjected to the heat of the lehr for such period of time that the temperatures thereof will be increased to substantially that of the rear article.

Figure 5:
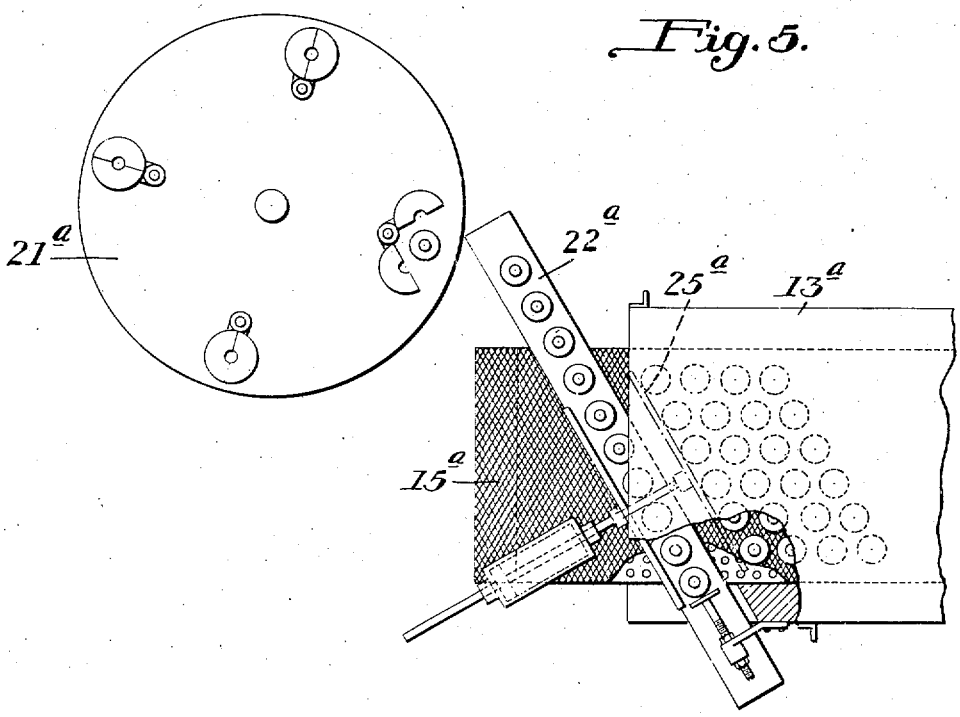
Fig. 5 is a plan view showing a modification of the apparatus of Fig. 2.
Figure 6:
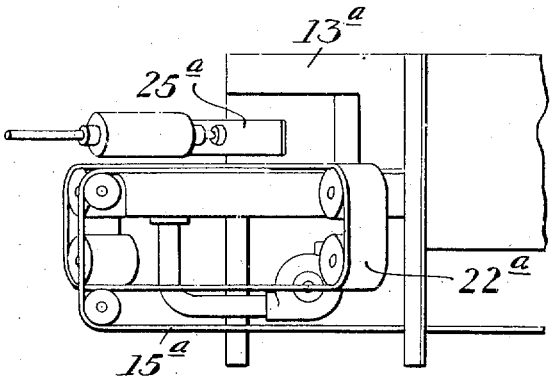
Fig. 6 is a perspective view, partially in front elevation, of the apparatus of Fig. 5.

Referring now to Fig. 5, I show a lehr which may be constructed in somewhat the same manner as the lehr of Figs. 1 and 2, but wherein the cover $13^a$ is of rectangular form instead of having one corner cut away as in Figs. 1 and 2. In this form of apparatus, a conveyor $22^a$ carries the ware from a mold table $21^a$ to the front of the lehr and the rows of ware are pushed from the conveyor to the lehr belt $15^a$ by a pusher bar $25^a$. The conveyor $22^a$ is disposed diagonally of the lehr and passes beneath one corner of the cover $13^a$ so that as the articles are advanced by the conveyor, the foremost ones of a row will be first to enter the lehr, and hence excessive cooling thereof will be prevented. As soon as a number of articles sufficient to form a row have reached the lehr, the pusher bar 25 is actuated, so that all of the articles are subjected to the heat of the lehr substantially as soon as they come opposite to the pusher bar. The articles are disposed in diagonal rows in the lehr, with the result that the article first to enter the lehr is discharged therefrom previous to the discharge of the other articles, and they are therefore all subjected to substantially the same period of heat treatment in the lehr.

Figure 7:
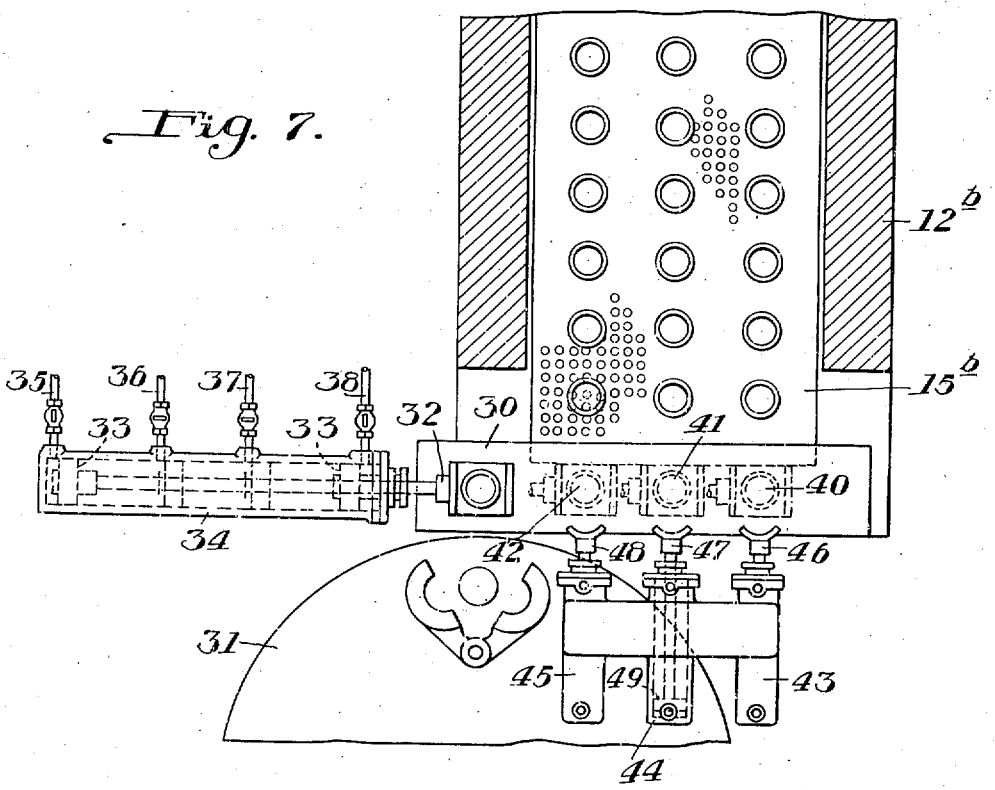
Fig. 7 is a plan view of still another modification.

In Fig. 7, apparatus is shown whereby articles of glassware may be placed without delay in a lehr $12^b$, in rows disposed transversely of the lehr. A ware-receiving shelf or plate 30 is provided, upon which ware from a mold table 31 is deposited in any suitable manner. As the ware is deposited upon the shelf 30, it is moved longitudinally of said shelf to a desired location in front of the lehr belt $15^b$, by a plunger 32 that is connected to a piston 33. The piston 33 operates in a cylinder 34 to which are connected pipes 35, 36, 37 and 38 that, through suitable connections (not shown), are made to serve both as fluid pressure inlet and exhaust passages.

If it is desired to move an article from the left end of the table 30 to a station 40, the pipe 38 is opened to exhaust and pressure is admitted through pipe 35 to force the piston 33 to the extreme right of the cylinder 34. If it is desired to move an article to a station 41, the pipe 37 is opened to exhaust and pressure admitted through pipe 35. When the piston 33 has passed pipe 37, it will come to rest, because the pressure from pipe 35 will be exhausted through pipe 37, and will be ineffective to advance the piston further. If it is desired to place an article at station 42 the pipe 36 is opened to exhaust and pressure admitted through pipe 35, so that when the piston passes the pipe 36, the pressure from 35 will be exhausted. In order to return the plunger 32 to the position shown in full lines in Fig. 7, pipe 35 is opened to exhaust, and pressure is admitted through pipe 38, the valves in pipes 36 and 37 being closed.

Simultaneously with the deposit of an article at station 40, 41 or 42, pressure is admitted to a cylinder 43, 44 or 45, as the case may be, to advance one of the plungers 46, 47 and 48, and push an article from the shelf 30 to the lehr belt $15^b$. The plungers 46, 47 and 48 are each connected to a piston, indicated in dotted lines at 49. The pistons 49 are retracted by fluid pressure admitted through ports at the forward ends of the cylinders 43, 44 and 45. Ware is delivered to the stations 40, 41 and 42 in sequence and the plungers are actuated in rotation.

Actuation of the plungers 46, 47 and 48 in timed relation to the movements of the plunger 33 may be effected through any well-known arrangement of valve connections for securing proper synchronism of movement of the plungers by means of a fluid pressure system.

Figure 8:
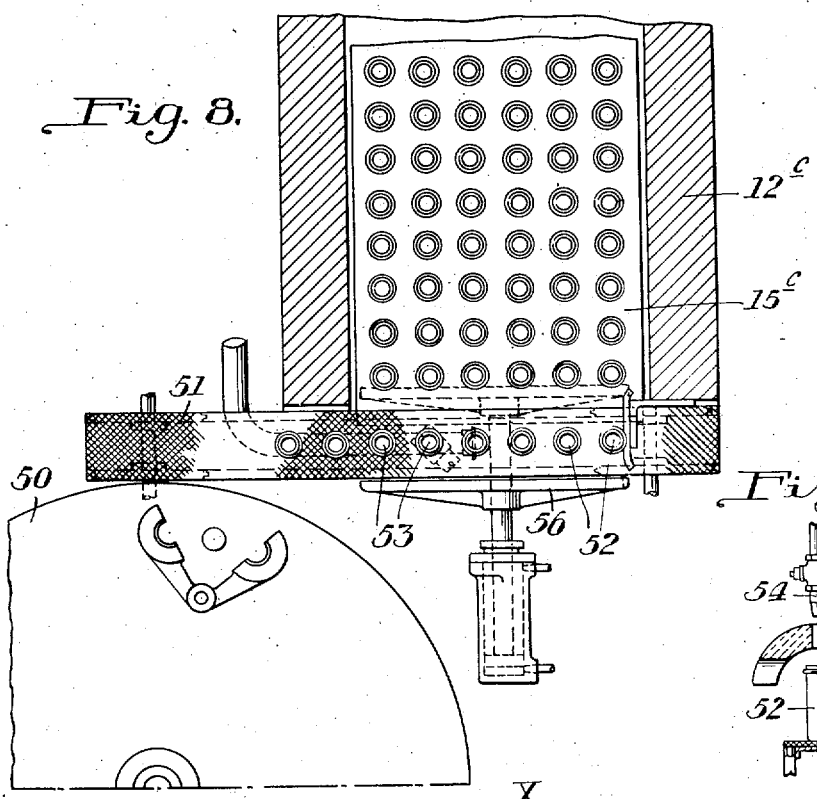
Fig. 8 is a plan view of a third modification of the apparatus of Fig. 2.
Figure 10:
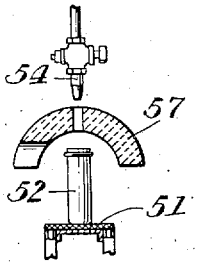
Fig. 10 is a sectional view taken on the line X—X of Fig. 9.
Figure 9:
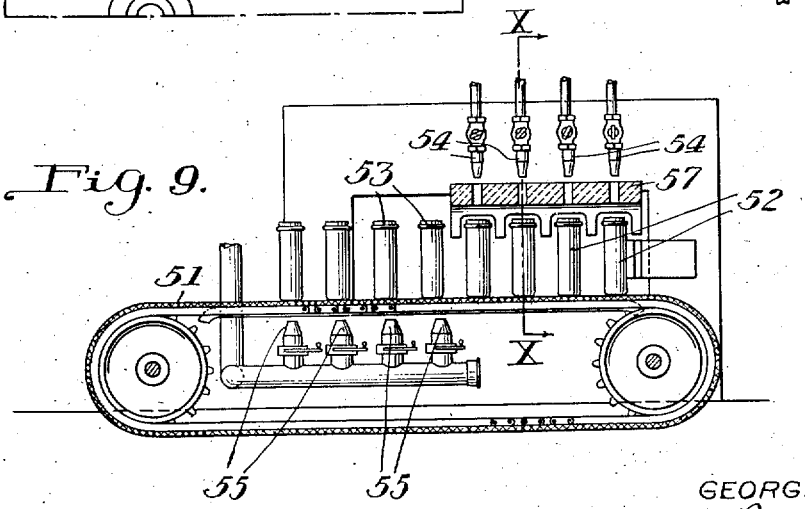
Fig. 9 is an end elevational view of a portion of the apparatus of Fig. 8.

In Figs. 8 to 10, I have shown still another arrangement whereby articles of glassware which are conveyed to the front of the lehr in sequence may be subjected to such temperature conditions that they will all be of substantially uniform temperature when placed within the lehr. The glassware formed in molds upon a mold table 50 is transferred to a conveyor 51, to be transported to the front of a lehr 12c. As the foremost articles 52 of a row are completed and placed upon the conveyor 51 in advance of articles 53 farther to the rear, I provide burners 54 for preventing the bottles 52 from becoming too cold. It will be seen that the foremost bottle 52 will be subjected to flames from all of the burners 54, since it is exposed to atmospheric conditions for a longer period of time than those bottles to the rear thereof. The next succeeding bottle 52 is exposed for a shorter period of time and is therefore subjected to flames from only three of the burners 54, and so on.

As to the bottles 53, such a short period of time elapses between their removal from the mold and their entry into the lehr that it is necessary to reduce their temperature, and for this purpose I provide jet pipes 55 through which a blast of cold air is supplied. The number of cooling jets and the amount of air supplied to each may be varied to suit conditions.

When a row of bottles 52—53 has reached a position in front of the lehr 12c, a fluid-operated pusher bar 56 is actuated to push the bottles from the conveyor 51 and from beneath the heat-retaining hood 57 to the conveyor belt 15c.

Variations may be made in the construction shown herein, without departing from my invention as set forth in the appended claims.

I claim as my invention:

1. Apparatus for handling and heat treating glassware, comprising a lehr, a lehr conveyor, and means for alternatively heating or cooling the ware placed on said conveyor, previous to subjecting said ware to heat treatment within the lehr.

2. Apparatus for handling and heat treating glassware, comprising a lehr, a perforated lehr conveyor belt, and means for directing a current of air through said belt from a point beneath the same, to bring the ware to the desired temperature previous to subjection thereof to heat treatment within the lehr.

3. Apparatus for handling and heat treating glassware, comprising a lehr, a perforated lehr conveyor belt, and means beneath said belt, at a point in advance of the entrance to the lehr, for changing the temperature of the ware.

4. Apparatus for handling and heat treating glassware, comprising a lehr, a perforated lehr conveyor belt, and means beneath said belt, at a point in advance of the entrance to the lehr, for controlling the temperature of the ware.

5. The combination with a lehr and means for assembling rows of partially cooled ware for heat treatment within the lehr, of means for transferring the rows to the lehr, and means for subjecting the articles composing a row to varying degrees of temperature, to compensate for differences in temperature as between the various articles of a given row.

6. The combination with a lehr and means for assembling rows of partially cooled ware for heat treatment within the lehr, of means for transferring the rows to the lehr, and means for subjecting the articles composing a row to varying degrees of temperature, to compensate for differences in temperature as between the various articles of a given row, the said means comprising a relative arrangement of lehr conveyor and assembling means such that the articles at the forward end of a row are brought under the influence of the heat within the lehr in advance of the articles further to the rear of said row.

7. The combination with a lehr and means for assembling partially cooled glass articles one-by-one to form rows extending transversely of the lehr, of means for subjecting each article of a row to a different temperature condition than other articles, to compensate for differences in period of time required to assemble and transfer the various articles of a given row.

8. The combinatin with a glass forming apparatus, of conveyor mechanism for receiving articles, one-by-one from said apparatus, means for transferring said articles in groups from the conveyor to the lehr, and means for maintaining the various articles of each group at substantially uniform relative temperatures during the period of travel from the forming apparatus to the lehr.

9. The combination with a glass forming apparatus and a lehr, of means for delivering articles one-by-one from the forming apparatus, and means for effecting transfer of each article of a row to the lehr at substantially the same temperature as the other articles of said row.

10. The combination with a lehr, of mechanism for assembling partially cooled glass articles in rows disposed transversely of the lehr and means for simultaneously transferring the articles of a given row to the lehr, the lehr having a cover portion whose forward edge is inclined in a direction transversely of the lehr.

11. The combination with a lehr and a conveyor for carrying rows of partially cooled glass articles to the point adjacent to the entrance end of the lehr, means for simultaneously transferring the articles of a row from the conveyor to the lehr, the conveyor and the forward edge of the lehr being relatively inclined, so that those articles toward the front of a row are subjected to the heat of the lehr in advance of the rearmost articles in said row.

12. The method of heat-treating glassware, which comprises depositing a glass article, while hot, upon a conveyor previous to movement of said conveyor into a lehr, subjecting the article to heat while so deposited, and thereafter causing the conveyor to carry it into the lehr.

13. The method of heat-treating glassware, which camprises depositing a glass article, while hot, upon a conveyor previous to movement of said conveyor into a lehr, subjecting the article to a temperature different than that of the surrounding atmosphere, and thereafter causing the conveyor to carry the article into the lehr.

14. The method of heat-treating glassware, which comprises assembling glass articles, one-by-one, placing a group of said articles simultaneously in a transverse row upon a conveyor, moving said conveyor through a lehr tunnel, and causing certain of the articles of said row to travel a different distance within the tunnel than the distance traveled by other articles composing the row.

15. The method of heat-treating glassware, which comprises assembling glass articles, one-by-one, placing a group of said articles simultaneously in a transverse row upon a conveyor, moving said conveyor through a lehr tunnel, and causing certain of the articles of said row to remain in the tunnel for a different period of time than other articles composing the row.

16. The method of heat-treating glassware, which comprises assembling glass articles, one by one, placing a group of said articles in a transverse row upon a conveyor, moving said conveyor through a lehr tunnel and causing each article to travel within the tunnel a distance proportionate to the time that has elapsed between the fabrication thereof and depositing of the same upon the conveyor.

17. The method of heat-treating glassware, which comprises assembling glass articles, one-by-one, placing a group of said articles in a transverse row upon a conveyor, moving said conveyor through a lehr tunnel, and causing each article to remain within the tunnel for a period of time proportionate to the time that has elapsed between the fabrication thereof and depositing of the same upon the conveyor.

18. The method of heat-treating glassware, which comprises assembling a row of articles with respect to a lehr in such manner that part of the row is between the enclosing walls of the lehr and part of the row exposed to the surrounding atmosphere, and depositing the articles simultaneously upon a conveyor for passage through the lehr.

19. The method of heat-treating glassware, which comprises assembling a row of articles with respect to a lehr in such manner that part of the row is between the enclosing walls of the lehr and part of the row exposed to the surrounding atmosphere, and depositing the articles simultaneously in a diagonal position upon a conveyor for passing through the lehr.

20. The method of heat-treating glassware, which comprises conveying articles in succession through a substantially given period of time from a forming mold to a conveyor belt, preliminary to passage thereof through a lehr tunnel, the articles being deposited at positions spaced transversely of the conveyor belt, but being disposed on approximately a given line extending substantially transversely of the tunnel.

21. The method of heat-treating glassware, which comprises successively removing a series of articles from a mold, placing them upon a collecting conveyor in a row transversely of a lehr tunnel, and exteriorly of the enclosing walls of said tunnel, and subjecting the articles to heat treatment while outside of said lehr walls, so as to maintain them at a substantially uniform temperature and thereafter pasing them through the lehr.

22. Apparatus for handling and heat treating glassware to effect the annealing thereof, comprising an elongate lehr tunnel, and a conveyor belt for transporting the ware therethrough, and means disposed adjacent to the ware entering end of said tunnel for alternatively supplying heat to or abstracting heat from the ware on said conveyor belt previous to subjecting the ware to annealing temperatures within said tunnel, whereby to compensate for various temperature conditions existing in the ware when placed upon said conveyor.

23. Apparatus for handling and heat treating glassware to effect the annealing thereof, comprising an elongate lehr tunnel, an endless conveyor belt for transporting the ware therethrough, and means disposed adjacent to the ware-entering end of said tunnel for alternatively supplying heat to or abstracting heat from the ware on said belt previous to subjecting the ware to annealing temperatures within said tunnel, said means comprising a chamber having an upper wall, over and in contact with which said belt passes, means for supplying heat to the interior of said chamber, and means alternatively for passing a cooling medium through said chamber, whereby to compensate for various temperature conditions existing in the ware when placed on said belt.

24. Apparatus for handling and heat treating glassware to effect the annealing thereof, comprising an elongate lehr tunnel, an endless conveyor belt for transporting the ware therethrough, and means disposed adjacent to the ware-entering end of said tunnel for alternatively supplying heat to or abstracting heat from the ware on said belt previous to subjecting the ware to annealing temperatures within said tunnel, said means comprising a chamber having an upper wall, over and in contact with which said belt passes, electric heating elements for supplying heat thereto when desired, a blower, a passage connecting said blower and said chamber, and damper means interposed in said passage, whereby controllable amounts of cooling air may be caused to pass through said chamber, alternatively to effect heating or cooling of the ware on said belt to compensate for various temperature conditions existing in the ware when placed thereupon.

25. Apparatus for handling and heat treating glassware to effect the annealing thereof, comprising an elongate lehr tunnel, an endless conveyor belt for transporting the ware therethrough, and means disposed adjacent to the ware-entering end of said tunnel for alternatively supplying heat to or abstracting heat from the ware on said belt previous to subjecting the ware to annealing temperatures within said tunnel, said means comprising a chamber disposed at least partially within said tunnel and having a wall disposed parallel to the path of said belt and in heat transferring relation to glassware thereon, means for supplying heat to the interior of said chamber when desired, and means for alternatively causing a cooling medium to pass through said chamber, whereby to compensate for various temperature conditions existing in the ware when placed upon said belt.

Signed at Hartford, Connecticut, this 27th day of February, 1930.

GEORGE E. HOWARD.